United States Patent
Abe et al.

(10) Patent No.: US 9,647,468 B2
(45) Date of Patent: May 9, 2017

(54) CHARGE CONTROL DEVICE, CHARGE CONTROL METHOD, PROGRAM, AND SYSTEM

(75) Inventors: Yuuichi Abe, Tokyo (JP); Yasuo Nakano, Tokyo (JP); Ryoki Honjo, Kanagawa (JP); Masahiro Suzuki, Fukushima (JP)

(73) Assignee: Sony Corporation, Tokyo (JP)

( * ) Notice: Subject to any disclaimer, the term of this patent is extended or adjusted under 35 U.S.C. 154(b) by 522 days.

(21) Appl. No.: 13/425,033

(22) Filed: Mar. 20, 2012

(65) Prior Publication Data
US 2012/0249057 A1 Oct. 4, 2012

(30) Foreign Application Priority Data
Mar. 30, 2011 (JP) .................. 2011-075765

(51) Int. Cl.
*H02J 7/00* (2006.01)
*H02J 7/04* (2006.01)

(52) U.S. Cl.
CPC ............ *H02J 7/0026* (2013.01); *H02J 7/041* (2013.01)

(58) Field of Classification Search
CPC G01R 31/3606; G01R 31/3679; H01M 10/42
USPC ........ 320/107, 108; 429/99–100; 361/87, 90
See application file for complete search history.

(56) References Cited

U.S. PATENT DOCUMENTS

| 8,421,814 B2 * | 4/2013 | Kim ................... 345/589 |
| 9,124,135 B2 | 9/2015 | Abe et al. |
| 2005/0024020 A1 * | 2/2005 | Hogari ............... G01R 31/3624 320/132 |
| 2010/0000809 A1 * | 1/2010 | Nishi et al. ............... 180/65.29 |
| 2010/0036628 A1 * | 2/2010 | Plestid ............... G01R 31/3679 702/63 |
| 2010/0045239 A1 * | 2/2010 | Oki .......................... 320/132 |
| 2011/0193516 A1 | 8/2011 | Oohara et al. |
| 2011/0288691 A1 * | 11/2011 | Abe ....................... F03D 7/00 700/292 |

FOREIGN PATENT DOCUMENTS

| CN | 101496255 | 7/2009 |
| CN | 101563827 | 10/2009 |
| CN | 101627517 | 1/2010 |
| EP | 1837944 | 9/2007 |

(Continued)

OTHER PUBLICATIONS

Notification of the First Office Action issued in connection with Chinese Patent Application No. 2012100802380, dated Feb. 2, 2015. (16 pages).

(Continued)

*Primary Examiner* — Drew A Dunn
*Assistant Examiner* — Zixuan Zhou
(74) *Attorney, Agent, or Firm* — K&L Gates LLP

(57) ABSTRACT

A charge control device including: a charge control unit configured to select a power storage device to be charged from a plurality of power storage devices in accordance with degrees of subsequent deterioration of the power storage devices, the degrees being calculated based on battery information of the power storage devices each having a secondary battery; and a transmission unit configured to transmit a charge command to a power storage device selected by the charge control unit.

19 Claims, 6 Drawing Sheets

(56) References Cited

FOREIGN PATENT DOCUMENTS

| | | | |
|---|---|---|---|
| JP | A 2003-111289 | 4/2003 | |
| JP | EP 1837944 A2 * | 9/2007 | .......... H01M 10/441 |
| JP | 2008-067418 | 3/2008 | |
| JP | 2008-309796 | 12/2008 | |
| JP | 2009240154 | 10/2009 | |
| JP | 2010-028876 | 2/2010 | |
| JP | 2010-041883 | 2/2010 | |
| JP | 2010-088214 | 4/2010 | |
| JP | A 2010-124634 | 6/2010 | |
| JP | A 2010-159661 | 7/2010 | |
| JP | 2010-232106 | 10/2010 | |
| WO | WO2011030380 | 3/2011 | |

OTHER PUBLICATIONS

Reasons for refusal notice issued in connection with Japanese Patent Application No. 2011-075765, dated Jan. 27, 2015. (8 pages).
Extended European Search Report received in EP Application 12001472.5 mailed Sep. 2, 2015 (6 pages).

* cited by examiner

| POWER STORAGE DEVICE ID | NUMBER OF CHARGE | ACCUMULATED DISCHARGE POWER |
|---|---|---|
| B001 | 100 | 1.08 kWh |

| ID | BATTERY CAPACITY ACCORDING TO SPECIFICATIONS | TYPE |
|---|---|---|
| B001 | 1.2 kWh | LITHIUM-ION |
| B002 | 3.6 kWh | LITHIUM-ION |
| ... | ... | ... |

| ID | POWER STORAGE DEVICE ID | NUMBER OF CHARGE | BATTERY CAPACITY RATE |
|---|---|---|---|
| D001 | B001 | 1 | 100% |
| D002 | B002 | 1 | 100% |
| ... | ... | ... | ... |
| D103 | B001 | 100 | 90% |
| D104 | B002 | 100 | 80% |
| ... | ... | ... | ... |

CHARGE CONTROL DEVICE, CHARGE CONTROL METHOD, PROGRAM, AND SYSTEM

CROSS REFERENCES TO RELATED APPLICATIONS

The present application claims priority to Japanese Priority Patent Application JP 2011-075765 filed in the Japan Patent Office on Mar. 30, 2011, the entire content of which is hereby incorporated by reference.

BACKGROUND

The present disclosure relates to a charge control device, a charge control method, a program, and a system.

In recent years, as a power supply for mobile terminals such as a cellular phone or a notebook computer, secondary batteries which can be used repeatedly by being recharged have been widely used.

On the other hand, from the viewpoint of global environmental protection and $CO_2$ emission reduction, renewable power generation which utilizes natural power sources such as sunlight, wind power, and geothermal heat has attracted much attention. Because these natural power sources are changing every moment depending on natural conditions such as sunshine and wind, it is difficult to supply stable power. Thus, some attempts are being made to supply stable power by combining the natural power sources with secondary batteries to stabilize the output power.

Thus, secondary batteries are expected to be utilized in various fields. However, there is a problem in that a secondary battery deteriorates, and its battery voltage and capacity are reduced while charging and discharging of the battery are repeated.

For example, Japanese Unexamined Patent Application Publication No. 2010-41883 discloses a power storage system which prevents charging of a power storage battery with an excessive current value for charge, and extends the life of the power storage battery. More specifically, according to the power storage system described in Japanese Unexamined Patent Application Publication No. 2010-41883, a time period during which charging amount increases in the power storage system is determined as a limiting time in which a current value for charge is limited, and the current value for charge during the limited time is calculated, on the basis of remaining capacity of a power storage battery, power pattern for load use, and forecast pattern of power generation. Therefore, charging with an excessive current value for charge is prevented, and extended life of the power storage battery can be achieved.

For example, Japanese Unexamined Patent Application Publication No. 2010-88214 discloses a method which eliminates an influence of a heat source on a device as much as possible, and increases the life of the power storage battery as a power supply. More specifically, according to the method described in Japanese Unexamined Patent Application Publication No. 2010-88214, in an electronic device which has a plurality of rechargeable batteries, the temperatures and the remaining amount of charge in rechargeable batteries are detected; continuous drive times are calculated according to a result made by the detection; a rechargeable battery is selected based on the calculated continuous driving times; and power is supplied to a load in the electronic device from the selected rechargeable battery. Therefore, rechargeable batteries having an extended life can be achieved.

SUMMARY

The system described in Japanese Unexamined Patent Application Publication No. 2010-41883 may prevent the flow of an excessive current for charging which is one of the causes of deterioration of a secondary battery, however, other causes of deterioration, such as a temperature or the number of charging operations are not taken into consideration. In addition, although the system described in Japanese Unexamined Patent Application Publication No. 2010-41883 may extend the life of a single secondary battery, in a power storage system which includes a plurality of secondary batteries, it is difficult to extend the lives of the secondary batteries.

The method described in Japanese Unexamined Patent Application Publication No. 2010-88214, controls charging process based on a temperature which is one of the causes of deterioration of a secondary battery, however, other factors of degradation such as a current used for charging or the number of charging operations not taken into consideration. In addition, the method described in Japanese Unexamined Patent Application Publication No. 2010-88214 may determine the order of power supply for a plurality of rechargeable batteries so as to extend their lives substantially uniformly. However, in the case where used and new rechargeable batteries are mixed with different degrees of deterioration, or the rechargeable batteries include different types, it is difficult to extend their lives uniformly.

In order to extend the life of a secondary battery, it is necessary to consider the type of each secondary battery, use environment such as a charging current and a temperature, individual user's usage such as frequency of use and hours of use. Each of these could be a factor of deterioration of a secondary battery. Consequently, by controlling a charging process in consideration of the degree of deterioration of each secondary battery, it is possible to extend the lives of the secondary batteries.

In the present disclosure, a novel and improved power storage control device, power storage control method, program, and charging control system are proposed that can extend the life of a power storage system comprehensively.

According to the present disclosure, a charge control device is provided which includes: a charge control unit configured to select a power storage device to be charged from a plurality of power storage devices in accordance with degrees of subsequent deterioration of the power storage devices, the degrees being calculated based on battery information of the power storage devices each having a secondary battery; and a transmission unit configured to transmit a charge command to a power storage device selected by the charge control unit.

According to the present disclosure, a method of controlling charge is provided which includes: selecting at least one power storage device to be charged from a plurality of power storage devices in accordance with degrees of subsequent deterioration of the power storage devices which are calculated based on battery information of the power storage devices having a secondary battery; and transmitting a charge command to the at least one power storage device.

According to the present disclosure, a program is provided which causes a computer to execute: selecting at least one power storage device to be charged from a plurality of power storage devices in accordance with degrees of subsequent deterioration of the power storage devices which are calculated based on battery information of the power storage devices having a secondary battery; and transmitting a charge command to the at least one power storage device.

According to the present disclosure, a charge control system is provided which includes: a plurality of power storage devices having a secondary battery, and a transmission unit configured to transmit battery information to the charge control device; and a charge control device having a charge control unit configured to select a power storage device to be charged from the power storage devices in accordance with degrees of subsequent deterioration of the power storage devices which are calculated based on the battery information transmitted from the power storage devices, and a transmission unit configured to transmit a charge command to the power storage device selected by the charge control unit.

As described above, according to the present disclosure, it is possible to extend the life of a power storage system comprehensively.

Additional features and advantages are described herein, and will be apparent from the following Detailed Description and the figures.

DETAILED DESCRIPTION

Hereinafter, a preferred embodiment of the present disclosure is described in detail with reference to the accompanying drawings. In the present description and the drawings, components that have substantially the same functional configurations are labeled with the same reference symbols, and duplicate description is omitted.

Description is Given in the Following Order:
1. Summary of Charge and Discharge Control System
2. Power Storage Device
3. Charge and Discharge Control Device
4. Specific Examples of Charge and Discharge Control
4-1. First Example
4-2. Second Example
4-3. Third Example
5. Conclusion <1. Summary of Charge and Discharge Control System>

Figure 1:
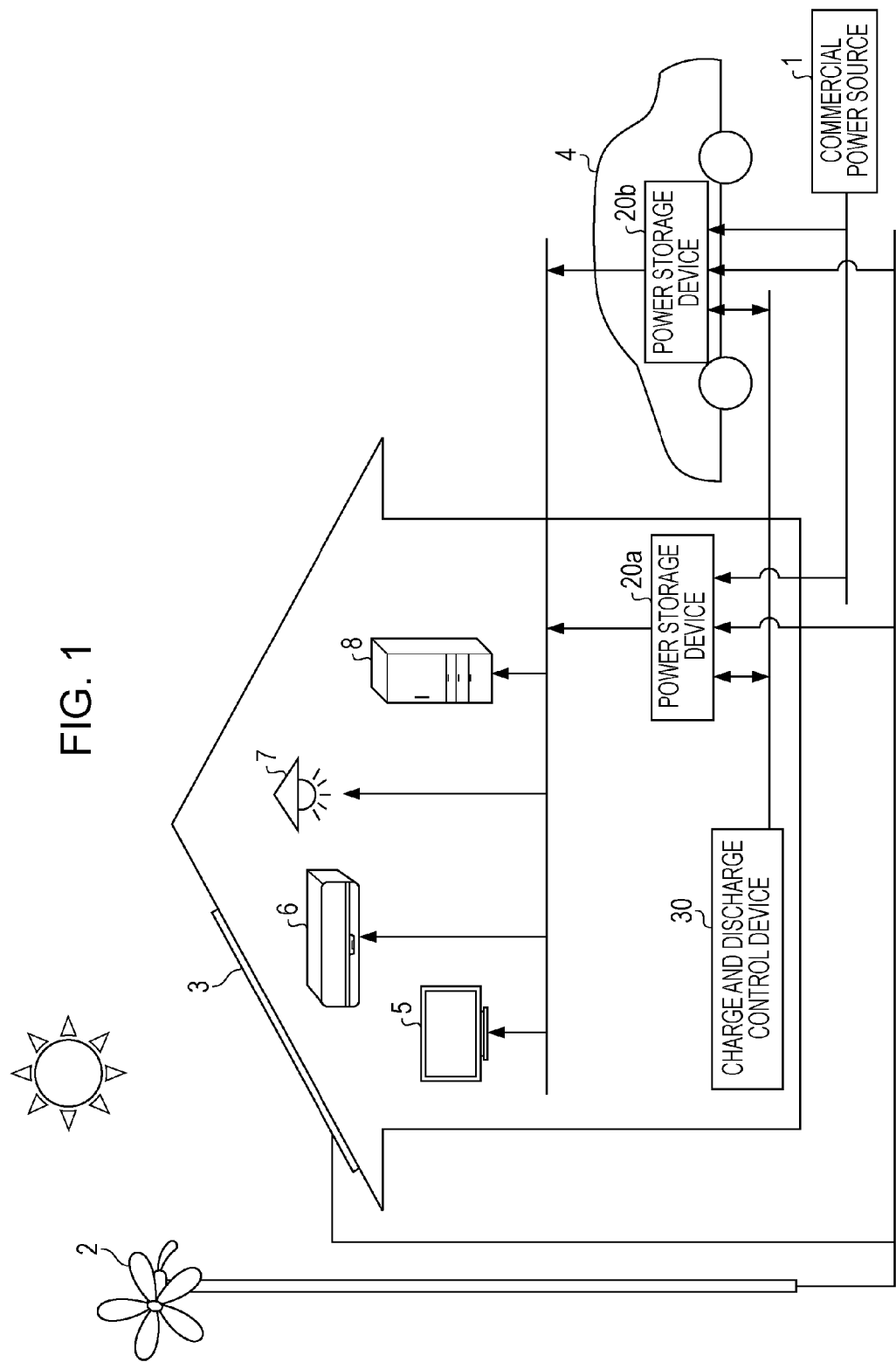
FIG. 1 is a schematic diagram of a charge/discharge control system according to the present disclosure.

First, a charge/discharge control system according to the present disclosure is described with reference to FIG. 1. FIG. 1 is a schematic diagram of the charge/discharge control system according to the present disclosure. As illustrated in FIG. 1, in the case where power supply from a commercial power source 1, and power generation units (such as a wind power generator 2, a photovoltaic power generator 3) is assumed in a general household, a power storage device 20a on which secondary batteries are mounted may be installed in the household in order to stabilize unstable power supply from the power generation units. The power storage device 20a installed in a household may perform a charge/discharge control in accordance with a difference in power rates during the daytime and night. Specifically, the power storage device 20a may be charged during the night when the power rates are low, and may be discharged during the daytime when the electric power rates are high. Furthermore, in the case where the electric power rates vary in accordance with fluctuations in demand for power consumption in the near future, the power storage device 20a installed in a household may forecast the fluctuations in demand for power consumption and control charge/discharge process. Specifically, the power storage device 20a is charged during a time period when demand for power consumption is low and the electric power rates are low, and is discharged during a time period when demand for power consumption is high and the electric power rates are high. The power storage device 20a supplies power to home electric appliances, for example, an image display 5, an air conditioner 6, a lighting device 7, and a refrigerator 8.

By the charge/discharge control performed by the power storage device 20a as described above, power consumption is stabilized not only in a general household but also in a local area, and the power to be supplied is stabilized for an electric power company. Consequently, it is effective to install a power storage device 20 in a household.

On the other hand, electric vehicles have attracted much attention as a next-generation eco-friendly vehicle. The electric vehicle receives power supplied from the outside to charge a secondary battery, and while the electric vehicle is moving, power is supplied to an electric motor in the electric vehicle from the secondary battery. The secondary battery installed in such an electric vehicle may be utilized as a home secondary battery during a time period in which the electric vehicle is not being driven. For example, as illustrated in FIG. 1, similarly to the power storage device 20a installed in a household, the power storage device 20b which is installed in an electric vehicle 4 and on which secondary batteries are mounted may supply power to home electric appliances, for example, the image display 5, the air conditioner 6, the lighting device 7, and the refrigerator 8.

An environment is assumed in which power is supplied to the home electric appliances from a plurality of secondary batteries in this manner. As such a home secondary battery and an electric vehicle have come into widespread use, the rate of development of secondary batteries has increased, and thus old secondary batteries and new secondary batteries are being used in a mixed manner. Thus, a charge/discharge control system according to the present disclosure extends the lives of a plurality of power storage devices 20 comprehensively by controlling a charge/discharge process in accordance with the characteristics of each power storage device 20 (power storage devices 20a, 20b, . . . ) with a charge/discharge control device 30. Hereinafter, detailed configurations of the power storage device 20 and the charge/discharge control device 30 that constitute such a charge/discharge control system are described sequentially.

<2. Power Storage Device>

The configuration and operational processing of the power storage device 20 included by the power accumulation control system according to the present disclosure are described with reference to FIGS. 2 to 4.

Figure 2:
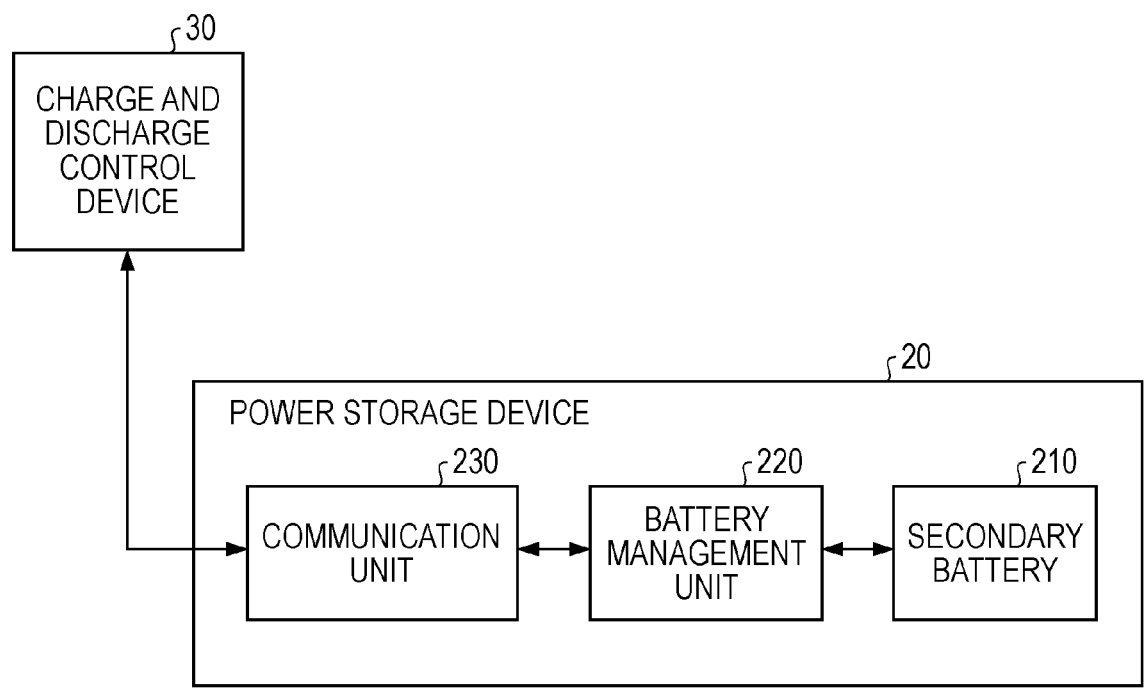
FIG. 2 is a block configuration diagram of a power storage device according to the present disclosure.

FIG. 2 is a block configuration diagram of the power storage device 20 according to the present disclosure. As illustrated in FIG. 2, the power storage device 20 according to the present disclosure includes a secondary battery 210, a battery management unit 220, and a communication unit 230.

The secondary battery 210 is a battery which can be repeatedly used by charging. The secondary battery 210 receives power supplied from the commercial power source 1, and the power generation units (such as the wind power generator 2, the photovoltaic power generator 3), and is charged. The power stored in the secondary battery 210 is supplied to home electric appliances in which the power storage device 20 is installed, for example, the image display 5, the air conditioner 6, the lighting device 7, and the refrigerator 8.

The battery management unit 220 controls the charge/discharge of the secondary battery 210. For example, the battery management unit 220 may charge the secondary battery 210 with the power which is supplied from the photovoltaic power generator 3 during the daytime, and may discharge the power during the night. Alternatively, the battery management unit 220 may charge the secondary battery 210 with the commercial power source 1 during the night when the electric power rates are low, and may discharge the power during the daytime when the electric power rates are high.

The battery management unit 220 according to the present disclosure monitors the secondary battery 210 and measures accumulated discharge power and the number of charging operations of the secondary battery 210. The battery management unit 220 performs battery information notification processing which transmits, as battery information, the measured accumulated discharge power and the number of charging operations to a charge/discharge control device via the communication unit 230. In addition, the battery management unit 220 performs charge/discharge control of the secondary battery 210 on the basis of a control command from the charge/discharge control device 30.

The communication unit 230 transmits and receives data to and from the charge/discharge control device 30. Specifically, the communication unit 230 transmits, as battery information, the accumulated discharge power and the number of charging operations that have been measured by the battery management unit 220 to the charge/discharge control device 30. In addition, the communication unit 230 receives a charge/discharge control command from the charge/discharge control device 30, and outputs the command to the battery management unit 220.

In the above, the configuration of the power storage device 20 according to an embodiment of the present disclosure has been described. Next, the battery information notification processing by the above-described battery management unit 220 is more specifically described with reference to FIG. 3.

Figures 3, 4:
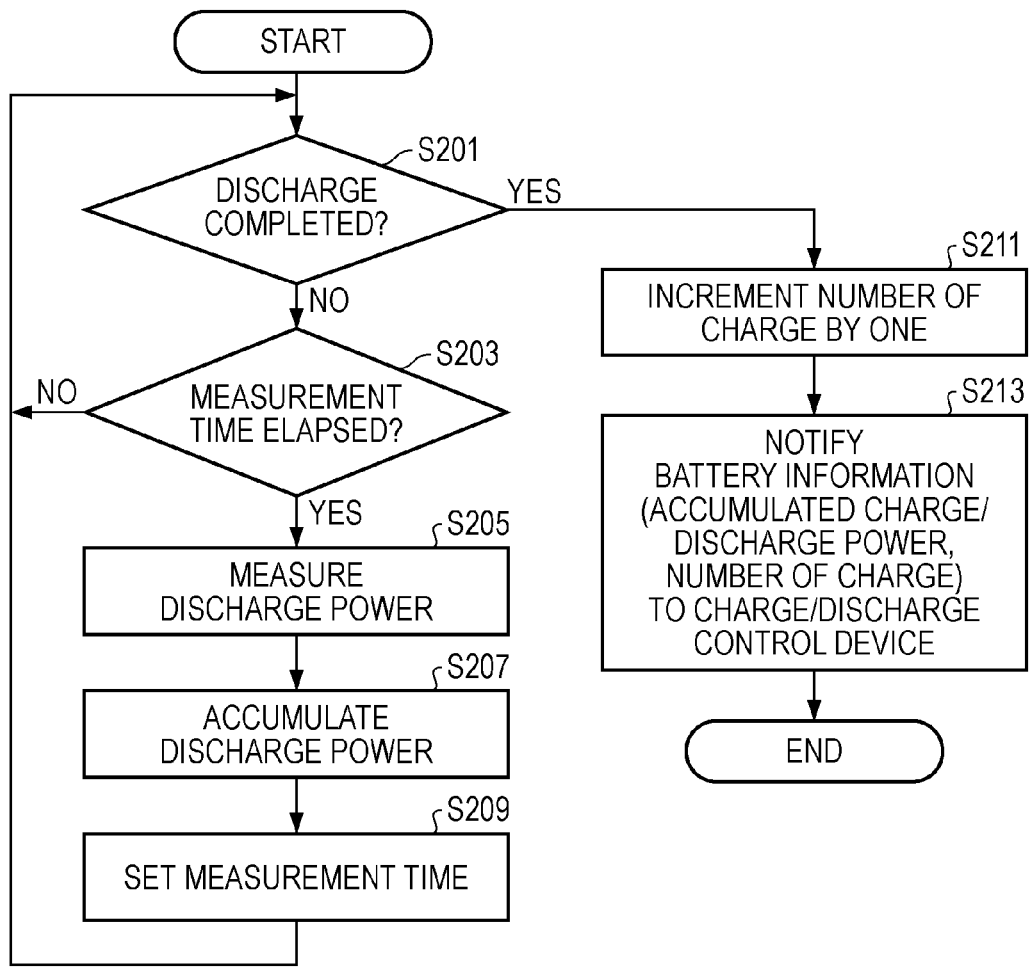
FIG. 3 is a flowchart illustrating battery information notification processing according to the present disclosure.
FIG. 4 is a diagram illustrating a specific data structure of battery information according to the present disclosure.

FIG. 3 is a flowchart illustrating the battery information notification processing according to the embodiment of the present disclosure. First, in step S201, the battery management unit 220 determines whether or not discharge of the secondary battery 210 is completed. When the discharge is not completed, the process proceeds to step S203, otherwise the process proceeds to step S211. When charge is performed again before discharge is completed, the battery information notification processing is stopped. That is to say, only when discharge is completed from a fully charged state, is the battery information notification processing executed. In the case where completion of discharge from a fully charged state is rare, the secondary battery 210 is periodically adjusted and controlled by the charge/discharge control device 3 so that discharge of the secondary battery 210 is completed from a fully charged state.

Next, in step S203, the battery management unit 220 determines whether or not a predetermined measurement time (for example, 1 second) has elapsed. In the case where the measurement time has elapsed, the process proceeds to step S203, otherwise the process proceeds to step S201.

Next, in step S205, the battery management unit 220 measures an instantaneous value P(W) of discharge power of the secondary battery 210.

Next, in step S207, the battery management unit 220 accumulates measured discharge power P(W). The discharge power P(W) measured in step S205 is assumed to be maintained during the measurement time S(h), and by adding the power amount PS calculated by discharge power P(W)×measurement interval S(h) (kWh) to the latest accumulated discharge power, up-to-date accumulated discharge power is calculated.

In step S209, the battery management unit 220 then adds the measurement interval to the current time to set the subsequent measurement time. Because the discharge power can be more accurately measured with a shorter measurement interval, more accurate accumulated discharge power can be measured.

Subsequently, when it is determined that the discharge is completed in step S201, the battery management unit 220 increases the number of charging operations by one in step S211, the number being held by the battery management unit 220. When charging is started before discharging is completed from a fully charged state (shallow charge/discharge), the battery management unit 220 does not increment the count, i.e., does not add one to the number of charging operations.

Then, in step S213, the communication unit 230 sends notification of battery information to the charge/discharge control device 30, the battery information including accumulated discharge power and the number of charging operations that have been measured by the battery management unit 220. Now, referring to FIG. 4, an example of the specific data structure of battery information which is notified by the notification unit 230 is described. The battery information illustrated in FIG. 4 contains "power storage device ID" for identifying the power storage device of the battery information transmission source, "number of charges", and "accumulated discharge power" when accumulated discharge power is measured. The battery information illustrated in FIG. 4 indicates that the power storage device with a power storage device ID of "B001" has discharged "1.08 kWh" at "100th" charge/discharge.

The battery information notification processing performed by the battery management unit 220 has been described above. The battery information notification processing may be performed for every charge/discharge operation, or with a frequency of once for n times (for example, n=10). When the battery information notification processing is performed once every n times, the battery management unit 220 increases the currently held number of charges by n times in the above step S211.

<3. Charge and Discharge Control Device>

Subsequently, the configuration and operational processing of the charge/discharge control device 30 included in the power accumulation control system according to the present disclosure are described with reference to FIGS. 5 to 9.

Figures 5, 6:
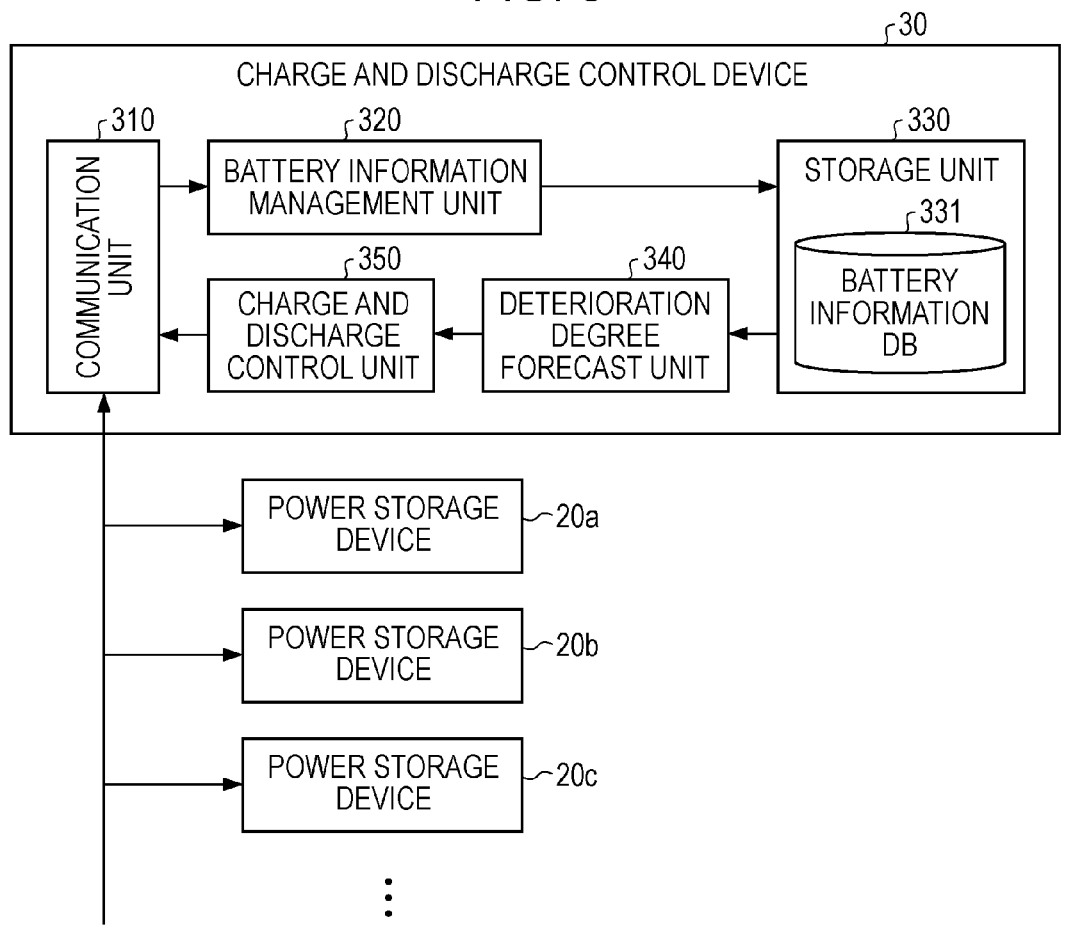
FIG. 5 is a block configuration diagram of a charge/discharge control device according to the present disclosure.
FIG. 6 is a diagram illustrating a specific data structure of power storage device information DB according to the present disclosure.

FIG. 5 is a block configuration diagram of the charge/discharge control device 30 according to the present disclosure. As illustrated in FIG. 5, the charge/discharge control device 30 according to the present disclosure includes a communication unit 310, a battery information management unit 320, a storage unit 330, a deterioration degree forecast unit 340, and a charge/discharge control unit 350.

The communication unit 310 transmits and receives data to and from the power storage device 20 (20a, 20b, 20c . . . ). Specifically, the communication unit 310 receives battery information from each power storage device 20, and transmits a charge/discharge control command to each power storage device 20.

The battery information management unit 320 accumulates the battery information received by the communication unit 310 in the storage unit 330. In this case, the battery information management unit 320 calculates the current battery capacity rate (%) of the transmission source power storage device based on the battery capacity (kWh) of the specification and the accumulated discharge power, the battery capacity (kWh) of the specification being a theoretical discharge power of the transmission source power storage device, and then accumulates the current battery capacity in the storage unit 330 as part of battery information. The current battery capacity rate (%) is calculated as Preal/Pspec* 100 (%) based on the accumulated discharge power Preal (kWh), and the battery capacity Pspec of the specification related to the power storage device (kWh). For example, when the accumulated discharge power (kWh) is the same as the battery capacity (kWh) of the specification, the current battery capacity rate (%) is calculated as 100%, and when the accumulated discharge power (kWh) is half of the battery capacity (kWh) of the specification, the current battery capacity rate (%) is calculated as 50%.

The charge/discharge control device 30 may store power storage device information DB in advance, which associates the model number data (power storage device ID) of each power storage device 20, with the battery capacity data of the specification, or may extract relevant information from the power storage device information DB stored on a network, based on the model number information of the power storage device. Hereinafter, the specific data structure of the above-described power storage device information DB is described with reference to FIG. 6.

FIG. 6 is a diagram illustrating the specific data structure of the power storage device information DB. As illustrated in FIG. 6, the power storage device information DB contains a plurality of pieces of power storage device information, i.e., ID, battery capacity (kWh) of the specification, and type. For example, the battery capacity of the specification of the power storage device with ID "B001" illustrated in FIG. 6 is "1.2 kWh", and the type is "lithium ion." In addition, the battery capacity of the specification of the power storage device with ID "B002" illustrated in FIG. 6 is "3.6 kWh", and the type is "lithium ion." When deterioration degree has characteristics according to the type of a power storage device, the type data contained in the power storage device information DB illustrated in FIG. 6 can be utilized when charge and discharge of the power storage device is controlled. For example, when the battery information of a power storage device is insufficient (for example, the number of charging operations so far is 0), the charge/discharge control device 30 can forecast a degree of deterioration of the power storage device based on the average deterioration degree according to the type of the power storage device.

Alternatively, the charge/discharge control device 30 may extract battery capacity data of the specification from the information currently released on a network using data mining technology. Otherwise, the power storage device 20 may transmit the battery capacity data of the specification of itself as part of the battery information.

Next, returning to FIG. 5, the storage unit 330 of the charge/discharge control device 30 is described. The storage unit 330 has battery information DB331. Data obtained by assigning unique ID to the battery information outputted from the battery information management unit 320 is accumulated and stored in the battery information DB (database) 331, the unique ID for managing the battery information in the battery information DB.

Figures 7, 8:
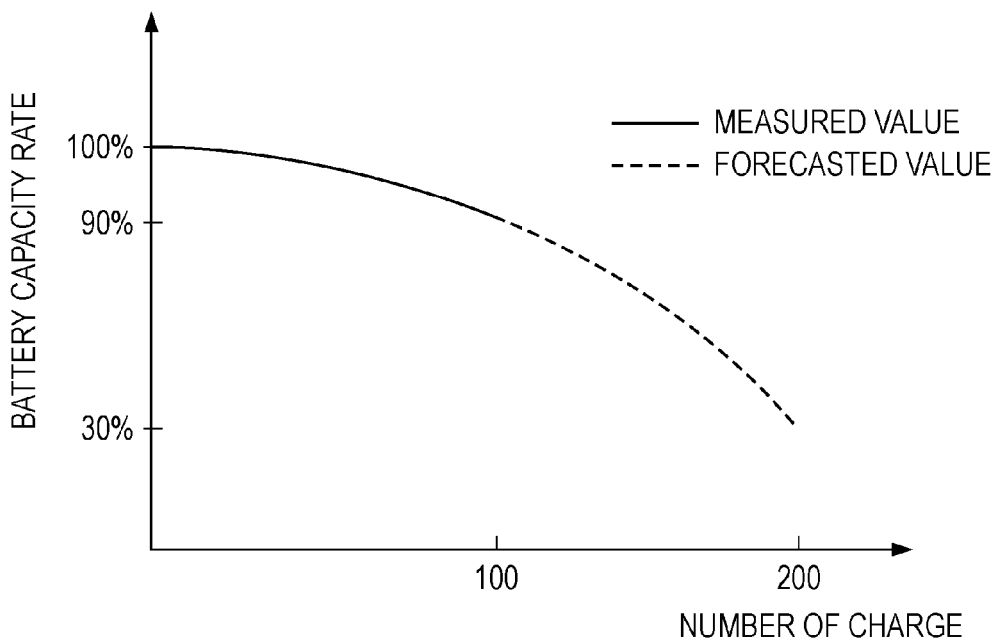
FIG. 7 is a diagram illustrating a data structure of battery information DB according to the present disclosure.
FIG. 8 is a diagram illustrating a graph of measured value and forecasted value of number of charges and battery capacity rate according to the present disclosure.

The data structure of the battery information DB331 is specifically described with reference to FIG. 7. As illustrated in FIG. 7, the battery information DB331 accumulates a plurality pieces of battery information, i.e., ID, power storage device ID, number of charges, and battery capacity. "ID" is an unique ID for managing the battery information in the battery information DB331. "Power storage device ID", "number of charges", and "battery capacity" are as described above.

The deterioration degree forecast unit 340 forecasts a degree of subsequent deterioration of a power storage device based on the number of charging operations data and the battery capacity data of the power storage device that are contained in the battery information accumulated in the battery information DB331. The degree of subsequent deterioration of a power storage device may be a degree of reduction in the charging capacity according to the number of charging operations of the power storage device, or the battery capacity after a predetermined number of charges, which is determined based on the degree of reduction. For example, the deterioration degree forecast unit 340 gathers battery information for the same power storage device ID from the battery information DB331, and extracts a combination of the number of charging operations × (time) of the power storage device having the same ID, and the battery capacity rate r (%). Then the deterioration degree forecast unit 340 forecasts a battery capacity rate r' at x'th time charge in the near future based on a plurality of combinations between the number of charging operations x and the battery capacity rate r (%). This is numerical forecast itself, and if there are sufficient number of charges and measured values of battery capacity rates, the above-mentioned values can be forecasted, for example, using technology of neural network.

Here, measured value and forecasted value of number of charges and battery capacity rate are specifically described with reference to FIG. 8. FIG. 8 is a diagram illustrating a graph of measured value and forecasted value of number of charges and battery capacity rate. As illustrated in FIG. 8, for a secondary battery which was charged and discharged for 100 times of iteration, the deterioration degree forecast unit 340 has, as a measured value, the battery capacity rate of the secondary battery after each time of iteration. The deterioration degree forecast unit 340 forecasts a decreasing curve of the battery capacity rate in the near future, based on the measured values, and forecasts the battery capacity rate, for example, when the secondary battery is charged and discharged 200 times according to the decreasing curve. In the example illustrated in FIG. 8, the deterioration degree forecast unit 340 can presume the decreasing curve shown by the dotted line, and can forecast the battery capacity rate when 200th charge and discharge are completed is 30% based on the decreasing curve.

The charge/discharge control unit 350 controls the charge/discharge state of each power storage device in order to extend the lives of a plurality of power storage devices comprehensively in accordance with the value of the battery capacity forecasted by the deterioration degree forecast unit 340. Specifically, the charge/discharge control unit 350 selects a power storage device to be charged from a plurality of power storage devices 20a, 20b, 20c, . . . A charge/discharge control command is transmitted via the communication unit 310 to the power storage device 20 which is selected by the charge/discharge control unit 350.

In the above, the configuration of the charge/discharge control device 30 has been described with reference to FIGS. 5 to 8. Subsequently, referring to FIG. 9, the charge/discharge control process by the charge/discharge control device 30 is described.

Figure 9:
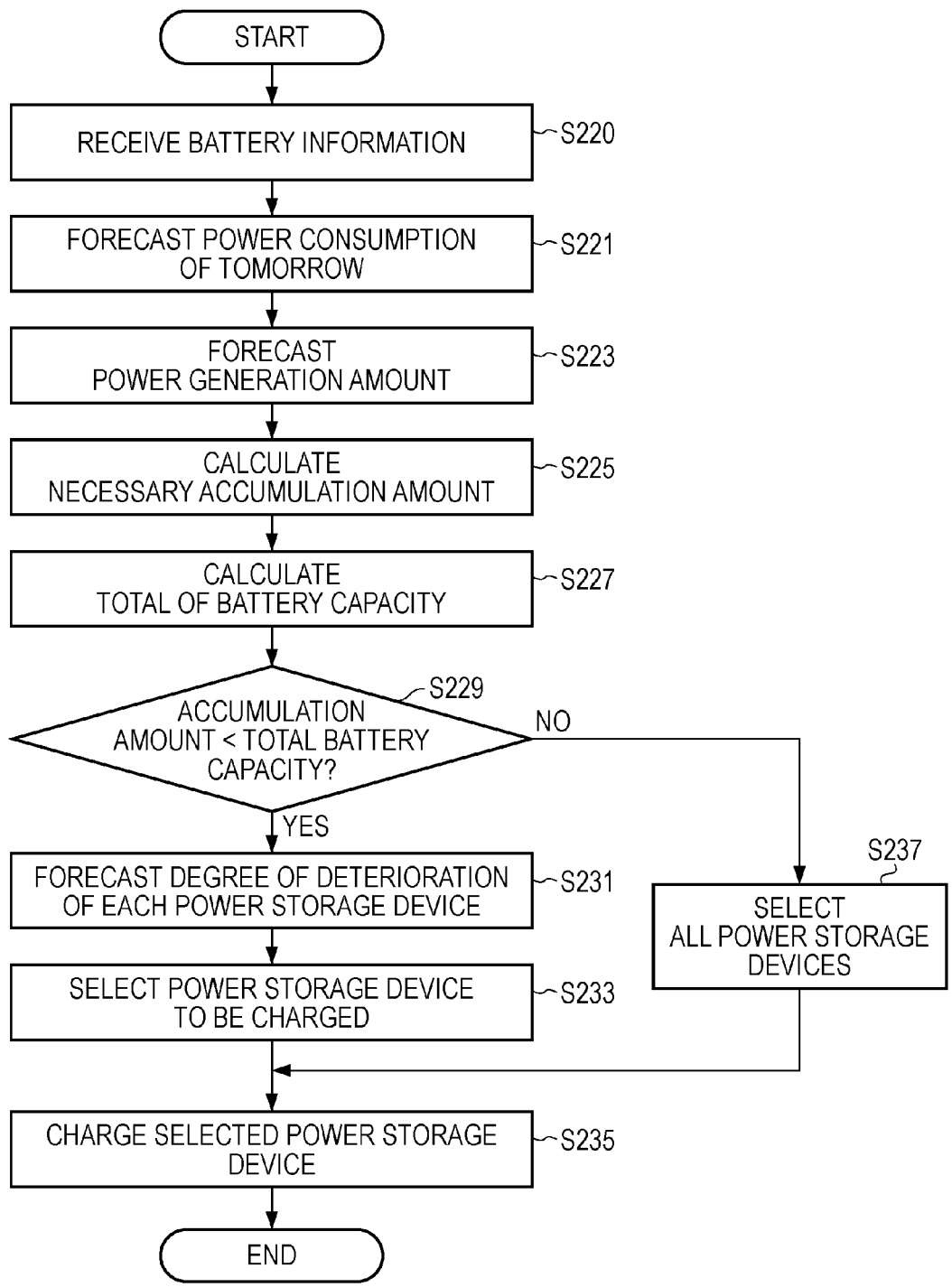
FIG. 9 is a flowchart illustrating charge control process according to the present disclosure.

FIG. 9 is a flowchart illustrating charge control process according to the present disclosure. First, in step S220, the charge/discharge control device 30 receives battery information from the power storage device 20. The received battery information is accumulated in the storage unit 330 by the battery information management unit 320.

Next, in step S221, the charge/discharge control unit 350 forecasts the power consumption of tomorrow. For example, in the case of household power consumption, it is possible to forecast the power consumption in the near future (tomorrow) based on the power consumption data in the past, for example, yesterday or one year ago. As the past power consumption data, data of household power consumption which is constantly monitored by a switchboard or the like and is stored, may be used. Alternatively, past power consumption data may be obtained from an electric power company and is used. In some cases, power consumption depends on an air temperature or a room temperature, and thus the charge/discharge control unit 350 may forecast the power consumption of tomorrow by using weather report data.

Next, in step S223, the charge/discharge control unit 350 forecasts the power generation amount of tomorrow. For example, when the photovoltaic power generator 3 is installed in a household, the charge/discharge control unit 350 forecasts the power generation amount of the photovoltaic power generator of tomorrow based on the weather report data and/or past power generation amount data.

Next, in step S225, the charge/discharge control unit 350 calculates necessary amount of power accumulation for tomorrow based on the forecasted power consumption of tomorrow and the forecasted power generation amount of tomorrow. For example, when it is forecasted that the power consumption of tomorrow is Pc (kWh), and the power generation amount of tomorrow is Pg (kWh), Pc-Pg (kWh) is calculated as the power to be supplied from a commercial power source. In the case where power rate during the night is lower than that during the daytime as in the current power rate system, the charge/discharge control unit 350 charges Pc-Pg (kWh) of power to the secondary battery during the night, and supplies power from the secondary battery during the daytime, and thus can save electric charges.

Next, in step S227, the charge/discharge control unit 350 calculates the total of the battery capacities of the power storage devices. The battery capacity of each power storage device can be calculated as Pspec*r/100 (kWh) by using the battery capacity rate r (%) in the latest data (data with the greatest number of charges) of each battery information accumulated in the battery information DB331, and the battery capacity Pspec (kWh) of the specification illustrated in FIG. 6. That is to say, the total of the battery capacities of the power storage devices is calculated as Σ Pspec*r/100.

Next, in step S229, the charge/discharge control unit 350 compares the necessary amount of power accumulation for tomorrow calculated in the above-mentioned step S225 with the total of the battery capacities calculated in the above-mentioned step S227. When the total of the battery capacities is greater than the necessary amount of power accumulation for tomorrow, the process proceeds to step S231. When the total of the battery capacities is less than or equal to the necessary amount of power accumulation for tomorrow, the process proceeds to step S237. That is to say, when the necessary amount of power accumulation to be charged is greater than the total battery capacity of a plurality of power storage devices, the charge/discharge control unit 350 controls all the power storage devices to be charged, and when the necessary amount of power accumulation is less than the total battery capacity, the charge/discharge control unit 350 selects a power storage device to be charged.

Next, in step S231, the deterioration degree forecast unit 340 forecasts the degree of subsequent deterioration of each power storage device. The forecast of the degree of deterioration by the deterioration degree forecast unit 340 is as described above. The deterioration degree forecast unit 340 outputs information of the degree of subsequent deterioration of each forecasted power storage device to the charge/discharge control unit 350.

Subsequently, in step S233, the charge/discharge control unit 233 continues to select a power storage device to be charged until the total of battery capacities exceeds the necessary amount of power accumulation to be charged based on the degree of subsequent deterioration of each forecasted power storage device. Selection of a power storage device to be charged based on forecasted values will be described in detail in <4. Specific Examples of Charge and Discharge Control>.

Then in step S235, a charge/discharge control command is transmitted from the communication unit 310 to the power storage device 20 selected by the charge/discharge control unit 350.

In response to a charge/discharge control command, the power storage device starts to charge a commercial power source or a power generation unit. When a charge amount instruction is included in the charge/discharge control command, the power storage device 20 does not charge the secondary battery 210 to the full, but charges it until charged amount reaches the instructed charge amount.

<4. Specific Examples of Charge and Discharge Control>

Next, selection of a power storage device to be charged made by the charge/discharge control unit 350 in accordance with degrees of subsequent deterioration of the power storage devices is described by way of specific examples.

[4-1. First Example]

As the first example, the charge/discharge control unit 350 selects a power storage device to be charged by placing a higher priority on a power storage device having a lower degree of subsequent deterioration. Specifically, the charge/discharge control unit 350 places a higher priority on a power storage device having a higher value of battery capacity rate (%) at xth charge/discharge. Accordingly, a power storage device which is forecast to have lower degree of deterioration caused by charge/discharge can be charged with a higher priority, and thus from a viewpoint of the overall power storage system, deterioration of a plurality of power storage devices can be reduced to a lower level, and thus comprehensive extended life of the battery capacity (kWh) is achieved.

When the degrees of subsequent deterioration is on the same order, a power storage device with a large battery capacity (kWh) of the specification may be selected with a higher priority. By selecting a power storage device with a large battery capacity (kWh) of the specification with a higher priority, the number of the power storage devices selected is decreased. Accordingly, the number of the power storage devices with increased deterioration due to charge and discharge can be reduced over the entire power storage system, deterioration of the entire power storage system can be reduced to a lower level comprehensively.

[4-2. Second Example]

As the second example, the charge/discharge control unit 350 selects a power storage device to be charged by placing a priority on the subsequent battery capacities (kWh) of a plurality of power storage devices based on the degree of subsequent deterioration of each power storage device, and the total of subsequent battery capacities (kWh) of the power storage devices. Specifically, the deterioration degree forecast unit 340 forecasts the battery capacity rate (%) at xth charge/discharge for each power storage device, and calculates the battery capacity (kWh) of at xth charge/discharge based on the forecasted battery capacity rate (%) and the battery capacity (kWh) of the specification, and thus forecasts the total of the subsequent battery capacities of the plurality of power storage devices. The charge/discharge control unit 350 selects a battery to be charged so that the total of the forecasted battery capacities (kWh) is increased.

Hereinafter, an example is described in (1) and (2) in the case where the current battery capacities (kWh) of the power storage device 20a and the power storage device 20b are as follows:

the power storage device 20a: 0.96 kWh (the battery capacity of the specification, 1.2 kWh×the current battery capacity rate, 80%); and the power storage device 20b: 2.52 kWh (the battery capacity of the specification, 3.6 kWh×the current battery capacity rate, 70%).

(1) In the case where the battery capacity (kWh) in the near future (for example, at 100th charge) can be forecasted that:

the power storage device 20a: 0.54 kWh (the battery capacity of the specification, 1.2 kWh×the current battery capacity rate, 45%); and the power storage device 20b: 1.98 kWh (the battery capacity of the specification, 3.6 kWh×the current battery capacity rate, 55%), after charging only the power storage device 20a for 100 times, it can be forecasted that the power storage device 20a has the battery capacity of 0.54 kWh (because only the power storage device 20a is used, the battery capacity (kWh) is reduced due to the deterioration of the power storage device 20a caused by charge/discharge), the power storage device 20b has the battery capacity of 2.52 kWh (because the power storage device 20b is not used, no deterioration of the power storage device 20b is caused by charge/discharge, and thus the battery capacity (kWh) usable for charge/discharge is maintained), and the total battery capacity is 3.06 kWh.

On the other hand, in the case where only the power storage device 20b is charged for 100 times, it can be forecasted that the power storage device 20a has the battery capacity of 0.96 kWh (because the power storage device 20b is not used, no deterioration of the power storage device 20a is caused by charge/discharge, and thus the battery capacity (kWh) usable for charge/discharge is maintained), the power storage device 20b has the battery capacity of 1.98 kWh (because only the power storage device 20b is used, the battery capacity (kWh) is reduced due to the deterioration of the power storage device 20b caused by charge/discharge), and the total battery capacity is 2.94 kWh.

That is to say, the total of the battery capacities (kWh) of the power storage devices after only the power storage device 20a is charged for 100 times is greater than the total of the battery capacities (kWh) of the power storage devices after only the power storage device 20b is charged for 100 times.

(2) In the case where the battery capacity (kWh) in the near future (for example, at 100th charge) can be forecasted that:

the power storage device 20a: 0.36 kWh (the battery capacity of the specification, 1.2 kWh×the current battery capacity rate, 30%); and the power storage device 20b: 2.16 kWh (the battery capacity of the specification, 3.6 kWh×the current battery capacity rate, 60%), after charging only the power storage device 20a for 100 times, it can be forecasted that the power storage device 20a has the battery capacity of 0.36 kWh (because only the power storage device 20a is used, the battery capacity (kWh) is reduced due to the deterioration of the power storage device 20a caused by charge/discharge), the power storage device 20b has the battery capacity of 2.52 kWh (because the power storage device 20b is not used, no deterioration of the power storage device 20b is caused by charge/discharge, and thus the battery capacity (kWh) usable for charge/discharge is maintained), and the total battery capacity is 2.9 kWh.

On the other hand, in the case where only the power storage device 20b is charged for 100 times, it can be forecasted that the power storage device 20a has the battery capacity of 0.96 kWh (because the power storage device 20a is not used, no deterioration of the power storage device 20a is caused by charge/discharge, and thus the battery capacity (kWh) usable for charge/discharge is maintained), the power storage device 20b has the battery capacity of 2.16 kWh (because only the power storage device 20b is used, the battery capacity (kWh) is reduced due to the deterioration of the power storage device 20b caused by charge/discharge), and the total battery capacity is 3.12 kWh.

That is to say, the total of the battery capacities (kWh) of the power storage devices after only the power storage device 20b is charged for 100 times is greater than the total of the battery capacities (kWh) of the power storage devices after only the power storage device 20a is charged for 100 times.

According to the example described in (1) and (2), with the forecast based on only the degree of deterioration, the power storage device 20a with less subsequent deterioration is selected with a higher priority according to the first example because the deterioration of the power storage device 20a is larger in each case of (1) and (2), however, when the total of the battery capacity (kWh) in the near future is forecasted based on the battery capacity (kWh) of the specification and the forecasted value of the degree of deterioration in the second example, the power storage device to be selected with a higher priority is different in (1) and (2).

Practically, without being limited to the case where only the power storage device 20a, or only the power storage device 20b is selected with a higher priority, for example, like the case where the power storage device 20a is charged for 60 times and the power storage device 20b is charged for 40 times, the ratio of "the power storage device 20a: the power-storage-device 20b" is changed to 10:0, 9:1, 8:2, . . . 2:8, 1:9, 0:10, and the total of the subsequent battery capacity (kWh) is calculated for each ratio, and a power storage device to be charged is selected so that the total battery capacity is maximized.

[4-3. Third Example]

As the third example, the charge/discharge control unit 350 selects a power storage device having a larger battery capacity (kWh) with a higher priority. Specifically, the deterioration degree forecast unit 340 forecasts the battery capacity rate (%) at xth charge/discharge for each power storage device, and calculates the battery capacity rate (%) at xth charge/discharge based on the forecasted battery capacity rate (%) and the battery capacity (kWh) of the specification. The charge/discharge control unit 350 selects a power storage device having a larger calculated battery capacity (kWh) at xth charge/discharge with a higher priority. According to the third example, because a power storage device having a larger calculated battery capacity (kWh) is selected with a higher priority, the number of the power storage devices to be charged is decreased. For example, when the necessary amount of power accumulation is 1 (kWh), one power storage device having a battery capacity of 1 kWh should be charged instead of charging 10 power storage devices each having a battery capacity of 0.1 kWh. Accordingly, the number of the power storage devices with increased deterioration due to charge and discharge can be reduced, deterioration of the entire power storage system can be reduced to a lower level comprehensively.

<5. Conclusion>

As described above, when a plurality of secondary batteries are used in a mixed manner, the charge control system according to the present disclosure can extend the life of the charge control system comprehensively by forecasting the degree of subsequent deterioration based on the number of charging operations and the battery capacity (%) of each second battery, thereby controlling charge/discharge process with a selection of a power storage device to be charged from the power storage devices.

In the above, a preferred embodiment of the present disclosure has been described in detail with reference to the accompanying drawings, however, the present technology is not limited to this example. For those who have basic knowledge of the technical field of the present disclosure, within the category of the technical idea described in the accompanying claims, it is apparent that various variations and modifications correspond to equivalents of the appended claims, and thus it should be understood that those variations and modifications are contained in the technical scope of the present disclosure.

For example, in the above-described embodiment, the battery information management unit 320 calculates the battery capacity rate (%) of the transmission source power storage device based on the battery capacity (kWh) of the specification and the accumulated discharge power, and then accumulates the battery capacity in the storage unit 330 as part of the battery information. However, the present technology is not limited to this example. The power storage device 20 may calculate the battery capacity (kWh) in advance, and may transmit the calculated battery capacity to the charge/discharge control device 30 as part of the battery information.

In the above-described embodiment, the charge/discharge control device 30 is installed in a household, and is connected to each power storage device via a wire or wirelessly, however, the present technology is not limited to this example. For example, a configuration allowing the connection between the charge/discharge control device 30 and the charge/discharge control device 30 is adopted, the charge/discharge control device 30 may be installed on the Internet. In this case the charge/discharge control device installed on the Internet manages the battery information obtained from the power storage devices in each household in a unified manner. By managing the huge battery information measured in many other households rather than one household in a unified manner, accuracy in the forecast of the power consumption and the amount of photovoltaic power generation can be improved.

The present technology can also have the following configurations.

(1) A charge control device including: a charge control unit configured to select a power storage device to be charged from a plurality of power storage devices in accordance with degrees of subsequent deterioration of the power storage devices, the degrees being calculated based on battery information of the power storage devices each having a secondary battery; and a transmission unit configured to transmit a charge command to a power storage device selected by the charge control unit.

(2) The charge control device according to the above-described (1), wherein the battery information contains accumulated discharge power information and number-of-charges information of the power storage device, the charge control device includes: a first calculation unit configured to calculate degrees of deterioration of the power storage devices based on the accumulated discharge power information and theoretical values of discharge power of the power storage devices; and a second calculation unit configured to calculate degrees of subsequent deterioration of the power storage devices based on the degrees of deterioration of the power storage devices calculated by the first calculation unit, and the number-of-charge information.

(3) The charge control device according to the above-described (1) or (2), wherein the charge control unit is configured to compare necessary power consumption value with a total of battery capacities of the power storage devices, and to select at least one power storage device from the power storage devices when the necessary power consumption value is less than the total of battery capacities of the power storage devices.

(4) The charge control device according to any one of the above-described (1) to (3), wherein the charge control unit is configured to select at least one power storage device in ascending order of degree of subsequent deterioration so that a total of battery capacity of the selected at least one power storage device satisfies the necessary power consumption value.

(5) The charge control device according to any one of the above-described (1) to (3), wherein the charge control unit is configured to select at least one power storage device so as to increase a total of subsequent battery capacity of the power storage devices so that a total of battery capacity of the selected at least one power storage device satisfies the necessary power consumption value.

(6) The charge control device according to any one of the above-described (1) to (3), wherein the charge control unit is configured to select at least one power storage device in descending order of subsequent battery capacity so that a total of battery capacity of the selected at least one power storage device satisfies the necessary power consumption value.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A charge control device comprising:
   a charge control unit configured to select a power storage device to be charged from a plurality of power storage devices; and
   a transmission unit configured to transmit a charge command to the power storage device selected by the charge control unit,
   wherein the power storage device selected by the charge control unit is based on degrees of subsequent deterioration of the storage devices, and wherein the degrees of subsequent deterioration of the storage devices are forecasted by a deterioration degree forecast unit on the basis of battery information, and wherein the power storage device has a least degree of subsequent deterioration.

2. The charge control device according to claim 1, wherein the charge control unit is configured to compare necessary power consumption value with a total of battery capacities of the power storage devices, and to select at least one power storage device from the power storage devices when the necessary power consumption value is less than the total of battery capacities of the power storage devices.

3. The charge control device according to claim 2, wherein the charge control unit is configured to select at least one power storage device in ascending order of degree of subsequent deterioration so that a total battery capacity of the selected at least one power storage device satisfies the necessary power consumption value.

4. The charge control device according to claim 2, wherein the charge control unit is configured to select at least one power storage device so as to increase a total subsequent battery capacity of the power storage devices so that a total battery capacity of the selected at least one power storage device satisfies the necessary power consumption value.

5. The charge control device according to claim 2, wherein the charge control unit is configured to select at least one power storage device in descending order of subsequent battery capacity so that a total battery capacity of the selected at least one power storage device satisfies the necessary power consumption value.

6. The charge control device according to claim 1, wherein the power storage device is configured to transmit battery information to the transmission unit and charge a secondary battery in the power storage device upon receiving the charge command.

7. The charge control device according to claim 1, wherein the charge control unit is configured to select the power storage device to be charged by placing a higher priority on the power storage device with a lower degree of subsequent deterioration.

8. The charge control device according to claim 1, wherein the degrees of subsequent deterioration of the power storage devices are changeable at least on the basis of the number of charging operation data.

9. A method of controlling charge in a charge control device including a charge control unit and a transmission unit, comprising:
   selecting at least one power storage device to be charged from a plurality of power storage devices in accordance with degrees of subsequent deterioration of the power storage devices which are forecasted by a deterioration degree forecast unit on the basis of battery information regarding the power storage devices, wherein the at least one power storage device has a least degree of subsequent deterioration; and
   transmitting by the transmission unit a charge command to the at least one power storage device selected by the charge control unit.

10. The method according to claim 9, wherein the power storage device is configured to transmit battery information to the transmission unit and charge a secondary battery in the power storage device upon receiving the charge command.

11. The method according to claim 9, wherein the charge control unit is configured to select the power storage device to be charged by placing a higher priority on the power storage device with a lower degree of subsequent deterioration.

12. A non-transitory program causing a charge control device including a charge control unit and a transmission unit to execute:
   selecting at least one power storage device to be charged from a plurality of power storage devices in accordance with degrees of subsequent deterioration of the power storage devices which are forecasted by a deterioration degree forecast unit on the basis of battery information regarding the power storage devices, wherein the at least one power storage device has a least degree of subsequent deterioration; and
   transmitting by the transmission unit a charge command to the at least one power storage device selected by the charge control unit.

13. The non-transitory program according to claim 12, wherein the power storage device is configured to transmit battery information to the transmission unit and charge a secondary battery in the power storage device upon receiving the charge command.

14. The non-transitory program according to claim 12, wherein the charge control unit is configured to select the power storage device to be charged by placing a higher priority on the power storage device with a lower degree of subsequent deterioration.

15. A charge control system, comprising:
   a plurality of power storage devices including
      a secondary battery, and
      a transmission unit configured to transmit battery information to
   a charge control device according to claim 1.

16. The charge control system according to claim 15, wherein the power storage device is configured to transmit the battery information to the transmission unit and charge the secondary battery in the power storage device upon receiving the charge command.

17. The charge control system according to claim 15, wherein the charge control unit is configured to select the power storage device to be charged by placing a higher priority on the power storage device with a lower degree of subsequent deterioration.

18. The charge control system according to claim 15, wherein the charge control unit is configured to compare necessary power consumption value with a total battery capacity associated with the power storage devices, and to select at least one power storage device from the power storage devices when the necessary power consumption value is less than the total battery capacity.

19. The charge control system according to claim 18, wherein the charge control unit is configured to select at least one power storage device in ascending order of degree of subsequent deterioration so that the total battery capacity associated with at least one power storage device satisfies the necessary power consumption value.

* * * * *